(12) United States Patent
Garcia et al.

(10) Patent No.: US 10,273,998 B2
(45) Date of Patent: Apr. 30, 2019

(54) MAGNETIC CLEAT FOR ACCESSORY BAR

(71) Applicant: Spectrum Brands, Inc., Middleton, WI (US)

(72) Inventors: Roberto Garcia, Buena Park, CA (US); Jan Van Leyen, Irvine, CA (US)

(73) Assignee: Spectrum Brands, Inc., Middleton, WI (US)

( * ) Notice: Subject to any disclaimer, the term of this patent is extended or adjusted under 35 U.S.C. 154(b) by 0 days.

(21) Appl. No.: 15/943,606

(22) Filed: Apr. 2, 2018

(65) Prior Publication Data

US 2018/0283428 A1 Oct. 4, 2018

Related U.S. Application Data

(60) Provisional application No. 62/480,872, filed on Apr. 3, 2017.

(51) Int. Cl.
| | |
|---|---|
| *A47G 1/17* | (2006.01) |
| *F16B 9/02* | (2006.01) |
| *F16M 13/02* | (2006.01) |
| *A47K 17/00* | (2006.01) |
| *F16B 1/00* | (2006.01) |

(52) U.S. Cl.
CPC .............. *F16B 9/02* (2013.01); *A47K 17/00* (2013.01); *F16B 1/00* (2013.01); *F16M 13/02* (2013.01); *A47K 2201/02* (2013.01); *F16B 2001/0035* (2013.01)

(58) Field of Classification Search
CPC ... A47K 17/00; A47K 5/05; F16B 2001/0035; F16B 9/02; F16M 13/02
USPC ............... 248/226.5, 309.4, 683; 206/818
See application file for complete search history.

(56) References Cited

U.S. PATENT DOCUMENTS

| | | | |
|---|---|---|---|
| 2002/0088909 A1* | 7/2002 | Chen ................ | A47G 25/0692 248/251 |
| 2014/0084119 A1* | 3/2014 | Frias ................ | F16B 5/01 248/206.5 |
| 2014/0374554 A1* | 12/2014 | Jordan ............. | F16M 13/022 248/206.5 |

* cited by examiner

*Primary Examiner* — Todd M Epps
(74) *Attorney, Agent, or Firm* — Merchant & Gould P.C.

(57) ABSTRACT

A first bracket is attached to a wall forming an anchoring point for an accessory hub. The accessory hub is attached to a second bracket that mates to the first bracket. Once properly mated together, the first bracket and second bracket may not be separated by a downward force. As a result, any accessory device attached to the accessory hub is properly secured to the wall. The accessory hub may also be attached to the first bracket and detached without the use of tools or intricate fasteners thereby facilitating simple removal at a later date.

20 Claims, 6 Drawing Sheets

SECTION A-A

SECTION C-C

MAGNETIC CLEAT FOR ACCESSORY BAR

CROSS REFERENCE TO OTHER APPLICATIONS

This application claims priority to U.S. Provisional Application Ser. No. 62/480,872 filed on Apr. 3, 2017, the entire contents of which are hereby expressly incorporated by reference.

TECHNICAL FIELD

This invention relates to the field of attachment devices. More specifically, this invention relates to the field of bathroom accessory attachment devices.

BACKGROUND OF THE INVENTION

Bathroom accessories are commonly attached to bathroom walls. These accessories include towel bars, towel rings, soap dishes, tumbler holders, and robe hooks. Many of these accessories incorporate hidden fasteners to avoid detraction from the aesthetic appearance of the accessory. In an attempt to conceal the fastener, many accessory designs are difficult to install. Small screws with limited access are often frustrating for an average homeowner.

Additionally, as styles change, many homeowners desire updated looks to their bathrooms. When changing the accessory it is often difficult to remove the old accessory without damaging the fasteners or surrounding wall area. Often times the old fasteners have enlarged the wall opening such that it is difficult to securely fix a new accessory in the same location.

What is therefore needed is an accessory mounting device that is easily secured to the wall. What is also needed is an accessory mounting device that is easily attached to the accessory. Finally, what is needed is an accessory mounting device that allows for simple removal of an attached accessory.

SUMMARY AND OBJECT OF THE INVENTION

A mounting bracket is configured to mount an accessory to a wall with a first bracket. The first bracket has a planar base configured for attachment against a vertical surface of a structure, such as the wall of a bathroom. A first sloped surface extends from the planar base of the first bracket forming a first cavity between the wall and the first sloped surface. An acute angle is also formed between the wall and the first sloped surface.

A second bracket is attached to an accessory and is configured to engage with and attach the accessory to the first bracket. The second bracket may also be an integral component of the accessory. The second bracket is similar to the first bracket. The second bracket includes a second planar base that attaches to the accessory. A second sloped surface extends from the second planar base forming a second cavity between the accessory and the second sloped surface. An acute angle is formed between the accessory and the second sloped surface.

A magnet within both the first cavity and the second cavity attracts each bracket to one another. When the first sloped surface is within the second cavity and the second sloped surface is within the first cavity the accessory is positively retained to the first bracket, thereby attaching the accessory perpendicularly to the wall. A selector may be used on the accessory that disengages the first bracket from the second bracket when manually engaged.

Further, the accessory can be in the form of a towel bar, a tissue holder, a towel ring, a soap dish, a robe hook, and a tumbler holder. Alternatively, the accessory can be a hum that attaches to any one of the aforementioned accessories.

BRIEF DESCRIPTION OF THE DRAWINGS

The present disclosure will be described hereafter with reference to the attached drawings which are given as non-limiting examples only, in which.

Corresponding reference characters indicate corresponding parts throughout the several views. The exemplifications set out herein illustrate an embodiment of the invention, and such exemplifications are not to be construed as limiting the scope of the invention in any manner.

DETAILED DESCRIPTION

Figure 1:
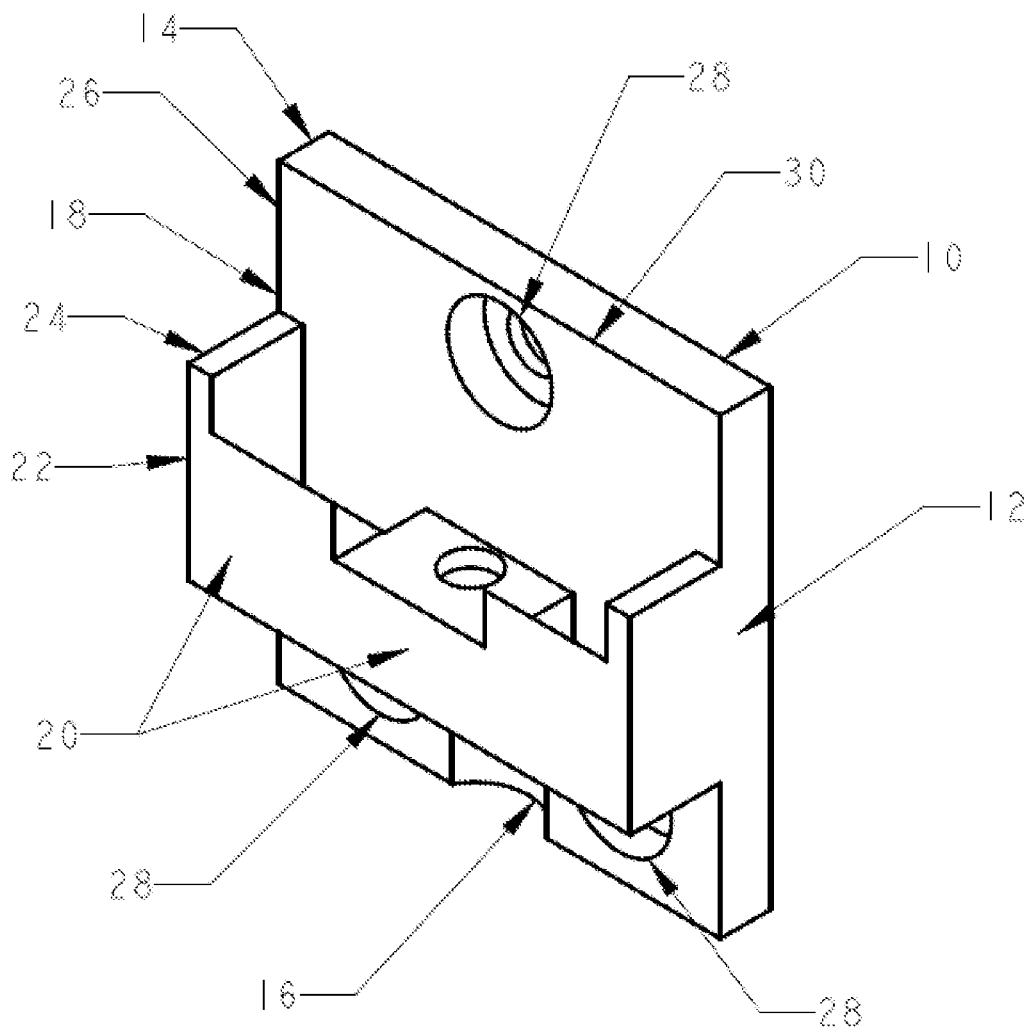
FIG. 1 is a raised, perspective view of the first bracket, according to one aspect of the invention.

FIG. 1 shows a first bracket 10 that is designed to be secured to a wall. Fasteners (not shown) may be inserted through fastener holes 28. A counterbore 14 allows the fastener head to sit within the surface of the first base 26 thereby providing a flush surface. The fastener holes 28 allow the first bracket 10 to be secured to a wall with the first cavity 22 in the vertical orientation. The first cavity 22 includes a sloped surface 20 that projects away from the first base 26. A sidewall 24 and an opposing sidewall 12 define the length of the first cavity 22. Each sidewall 24, 12 extends vertically past the sloped surface 20 further defining the first cavity 22.

A ledge 18 extends perpendicularly from the first base 26 at the center of the sloped surface 20. The ledge 18 includes a magnet 30 that may be inserted or integrated into the ledge 18. A divot 16 in the first base 26 allows the magnet 30 to be inserted into the ledge 18 from the opposing side of the ledge 18. The divot 16 is shaped such that the magnet 30 will not protrude into the first cavity 22.

Figure 2:
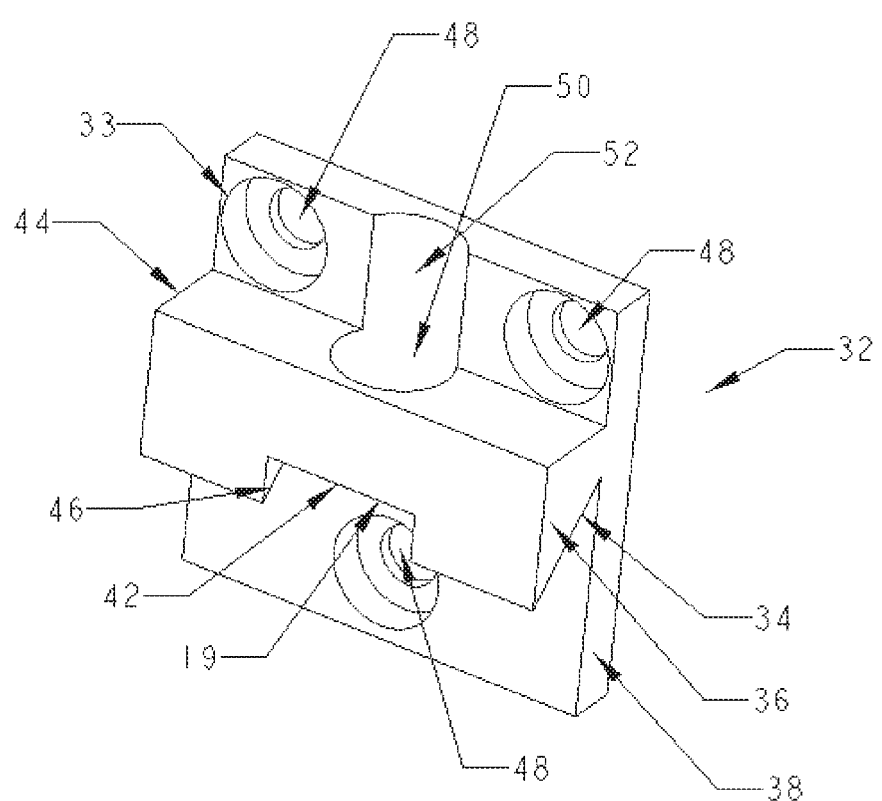
FIG. 2 is a raised, perspective view of the second bracket, according to another aspect of the invention.

The first bracket 10 is designed to mate with a second bracket 32 as shown in FIG. 2. The second bracket 32 is similarly shaped as the first bracket 10 and is designed to be attached to an accessory (such as a towel bar). Fasteners (not shown) may be inserted through fastener holes 48. A counterbore 33 allows the fastener head to sit within the surface of the second base 38 thereby providing a flush surface. The fastener holes 48 allow the second bracket 32 to be secured to the accessory with the second cavity 42 in the vertical orientation, but inverted and opposing the orientation of the first cavity 22 of the first bracket 10. The second cavity 42 includes a sloped surface 46 that projects away from the second base 38. A sidewall 44 and an opposing sidewall 36 define the length of the second cavity 42. The second bracket 32 is formed with sidewalls 44, 36 that do not extend past the sloped surface 34. As a result, the sidewalls 44, 36 of the second bracket 32 are triangularly shaped to match the sloped surface 46, unlike the sidewalls 24, 12 of the first bracket 10 which are rectangular in shaped. This unique configuration of the sidewalls 44, 36 allows the sloped surface 46 to nest within the first cavity 22 of the first bracket 10.

A ledge 19 extends perpendicularly from the second base 38 at the center of the sloped surface 46. The ledge 19 includes a magnet 50 that may be inserted or integrated into the ledge 19 and assist in retaining the nested brackets together. A divot 52 in the second base 38 allows the magnet 50 to be inserted into the ledge 19 from the opposing side of the ledge 19. The divot 52 is shaped such that the magnet 50 will not protrude into the second cavity 42. The first bracket 10 nests together with the second bracket 32 as shown and described in FIG. 7.

Figure 3:
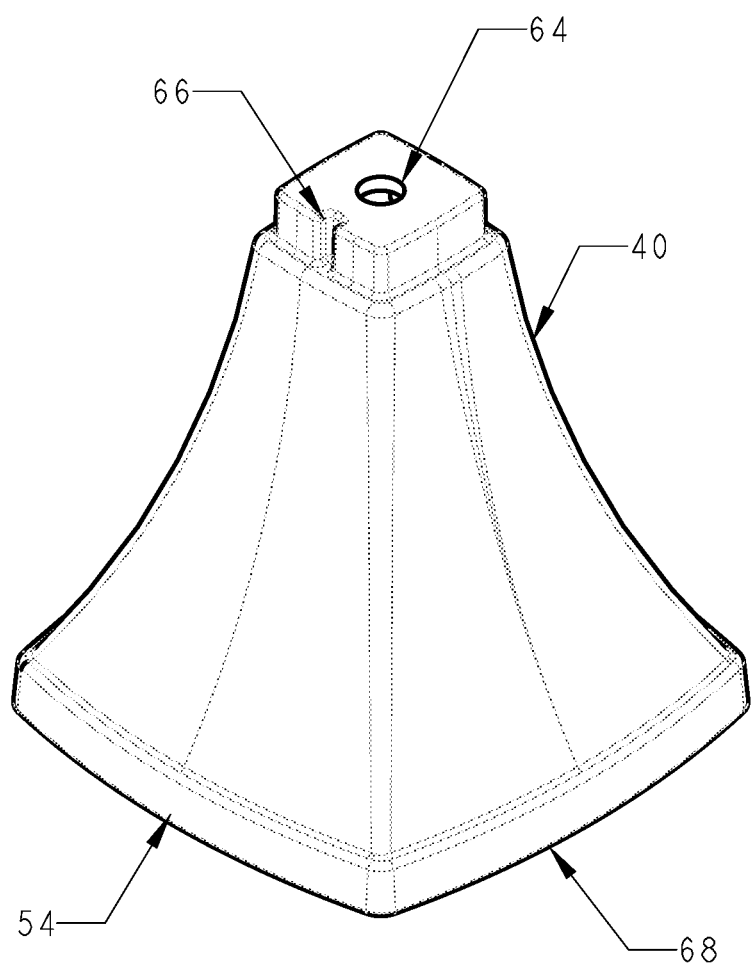
FIG. 3 is a raised, perspective view of an accessory hub attached to a wall using the first and second brackets of FIGS. 1 and 2.

Moving on to FIG. 3, an accessory hub 40 is shown. The accessory hub 40 forms the attachment point for any bathroom accessory such as a towel bar, towel ring, shelf, tissue holder, soap tray, tumbler holder, or the like. The accessory hub 40 has a foundation 68 which abuts the mounting surface, such as a wall. A mount 64 allows the accessory device, i.e. bar, to attach to the accessory hub 40 with a fastener. A slot 66 may be used to ensure proper alignment with the accessory. A selector 54 may also be used on the accessory hub which allows a user to depress the selector 54 and disengage the second bracket 32 from the first bracket 10 by manipulating the magnets 30, 50 when the selector 54 is depressed. The second bracket 32 is designed to be inserted into the foundation 68 of the accessory hub 40 with the fastener holes 48 within the second base 38.

Figure 4:
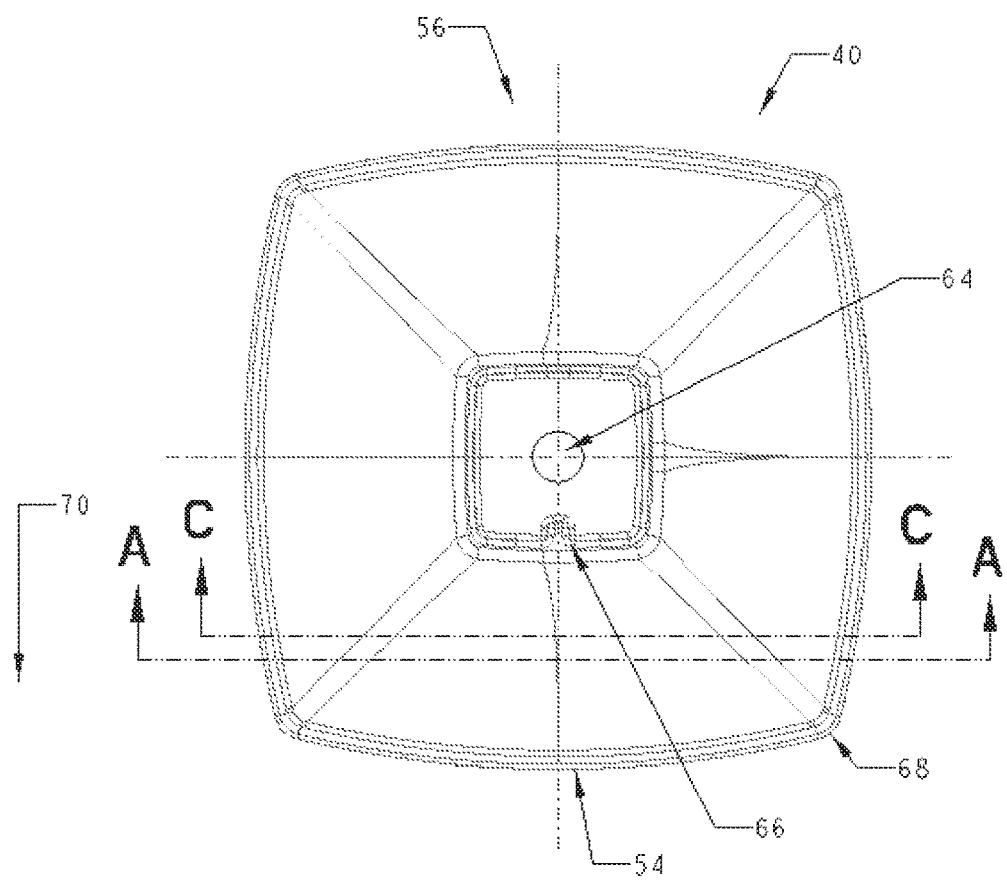
FIG. 4 is a top view of the accessory hub of FIG. 3.

FIG. 4 shows an overhead view of the accessory hub 40 outlining the various section views that are described as follows. Each one of the section views depicts the accessory hub in an installed orientation, with the first bracket 10 mounted on a vertical wall and nested with the second bracket 32, which is attached to the accessory hub 40.

Figure 5:
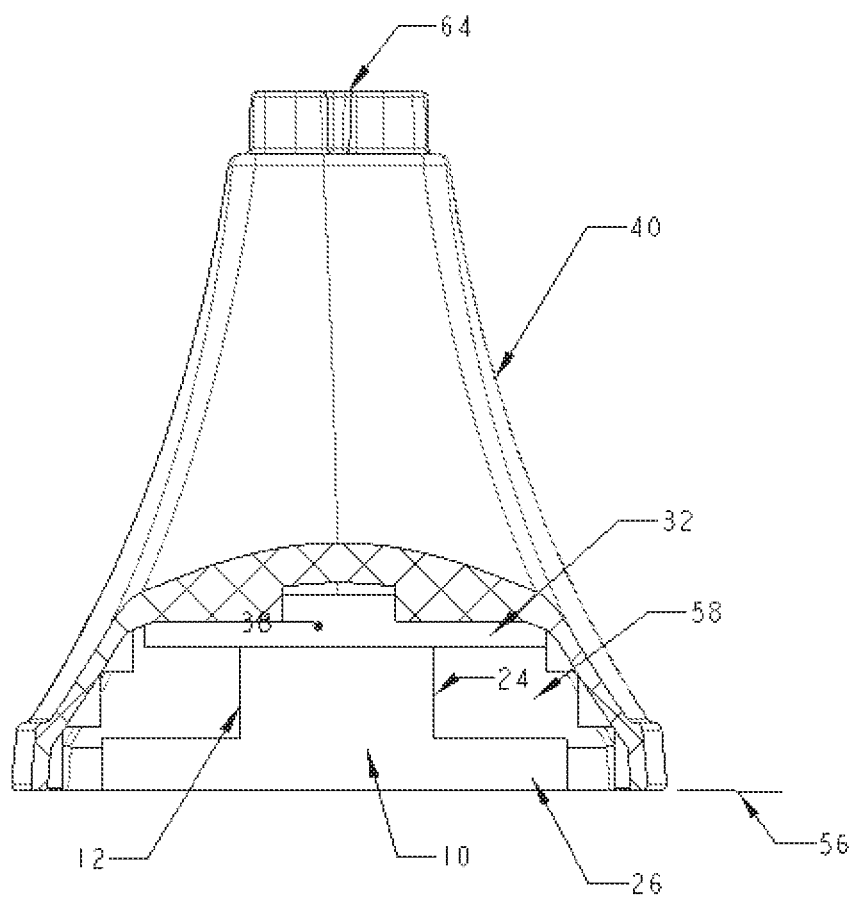
FIG. 5 is a sectional view of the accessory hub along section line AA shown in FIG. 4.

Section AA is shown in FIG. 5. and reveals the recess 58 within the foundation 68 of the accessory hub 40. The recess 58 is simply a hollowed-out portion of the accessory hub 40. The recess 58 accommodates the first bracket 10 and the second bracket 32. Due to the angle of section AA, looking up from below the accessory hub 40, the first bracket 10 is predominantly shown. The first base 26 of the first bracket 10 is secured to the wall 56. The second base 38 of the second bracket 32 is secured to the accessory hub 40 within the recess 58. The sloped surface 34 and sidewalls 36, 44 of the second bracket 32 is nested within the first cavity 22 (see FIG. 1) of the first bracket 10. As previously discussed, the mated sloped surfaces of the first bracket 10 and the second bracket 32 prevent downward motion of the accessory hub 40. As the sidewalls 36, 44 of the second bracket 32 are within the first cavity 22 of the first bracket 10, the sidewalls 12, 24 prevent side-to-side motion of the accessory hub 40. Lastly, the mated magnets 30, 50 restrict upward motion of the accessory hub 40. The accessory hub 40 is therefore secured in place against the wall 56.

Should removal of the accessory hub 40 from the wall 56 be desired, a vertical force on the accessory hub 40 may be applied. The vertical force should be substantial enough to overcome the magnetic attraction of the magnets 30, 50. Alternatively, the selector 54 (see FIG. 3) may be depressed which urges a separation of the magnets 30, 50. The accessory hub 40 may therefore be easily removed from the wall 56 without the use of tools and without the manipulation of small fasteners such as set screws. Since the applied force to remove the accessory hub 40 from the wall 56 is in the vertical direction, the weight of an object such as a towel bar, towel, soap dish, soap, or the like on the accessory hub 40 will only further secure the accessory hub 40 in place, securely attached to the wall 56.

Figure 6:
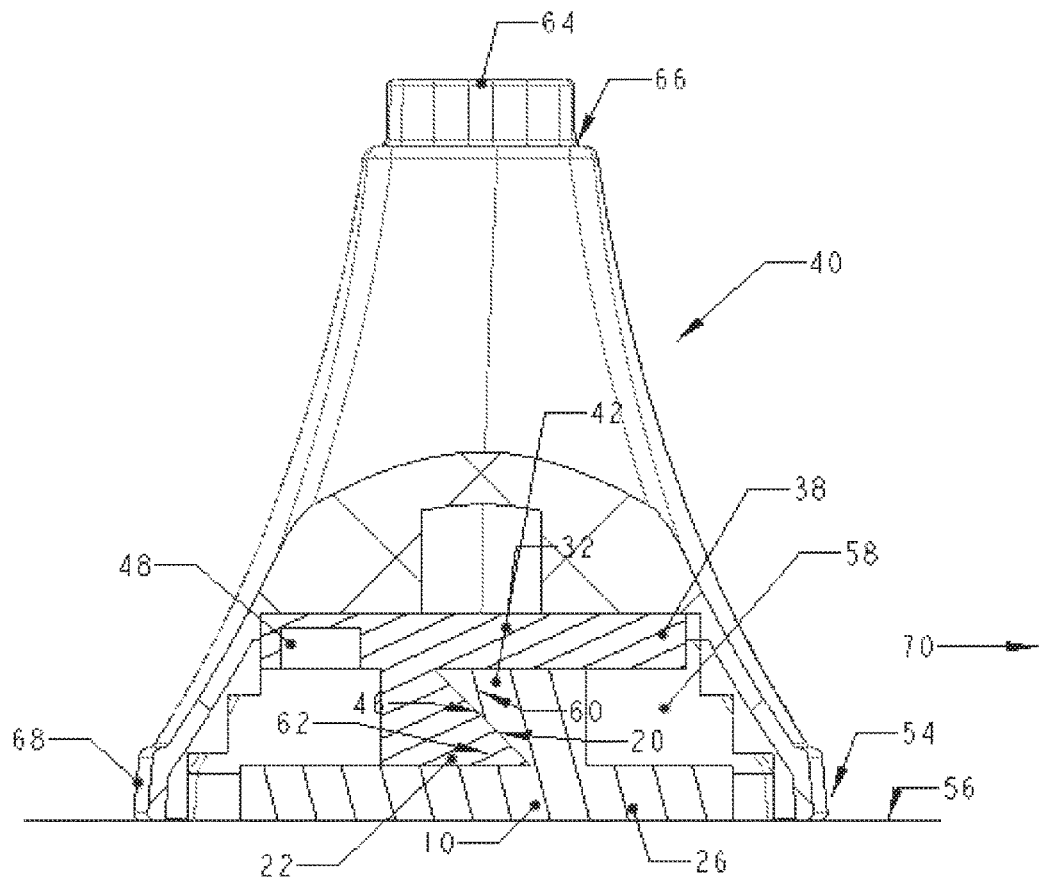
FIG. 6 is a sectional view of the accessory hub along section line CC shown in FIG. 4.

FIG. 6 shows another section view of section CC. The first bracket 10 is secured against the wall 56. the "down" arrow 70 indicates the downward direction on the wall, as also shown in FIG. 4. The first bracket 10 forms an acute angle 62 between the sloped surface 20 and the first base 26. The acute angle 62 is also formed between the sloped surface 20 and the wall 56. The second bracket 32 similarly includes an acute angle 60 formed between the second base 38 and the sloped surface 46 thereby defining the second cavity 42. Both acute angles 60, 62 are formed with similar angles to allow the sloped surfaces 20, 46 to contact one another and place the first base 26 parallel to the second base 38. This provides a secure mount for the accessory hub 40 thereby preventing any forces in the down 70 direction from dislodging or removing the accessory hub 40 from the wall 56. As the first bracket 10 and second bracket 32 are placed within the recess 58 of the accessory hub 40, the mounting hardware is fully concealed from sight. The foundation 68 forms a barrier around the entire cavity 58 and is held in place flush against the wall 56.

It is noted that the magnets 30, 50 as shown in FIG. 2 are not pictured in FIG. 6 due to the location of section line CC. Also not shown in the mechanism whereby the selector 54 would separate the first bracket 10 from the second bracket 32.

Although the present disclosure has been described with reference to particular means, materials and embodiments, from the foregoing description, one skilled in the art can easily ascertain the essential characteristics of the present disclosure and various changes and modifications may be made to adapt the various uses and characteristics without departing from the spirit and scope of the present invention as set forth in the following claims.

We claim:
1. An accessory mounting bracket comprising:
a first bracket with a first base configured for attachment to a structure;
opposing sidewalls extending from the first base;
a first sloped surface extending from the first base between the opposing sidewalls of the first bracket;
a first cavity formed between the opposing sidewalls of the first bracket;
a magnet within the first cavity;
a second bracket with a second base configured for attachment to an accessory;
opposing second sidewalls extending from the second base;
a second sloped surface extending from the second base between the opposing sidewalls of the second base;
a second cavity formed between the second sidewalls of the second bracket;
a magnet within the second cavity; and
wherein an angle of the first sloped surface to the first base is the same as an angle of the second sloped surface to the second base such that the first and second sloped surfaces nest with each other aligning the bases in parallel.
2. The accessory mounting bracket according to claim 1, wherein the magnet within the first cavity is attracted to the magnet within the second cavity such that the first sloped surface is attracted to and retained against the second sloped surface when in proximity to one another.

3. The accessory mounting bracket according to claim 1, wherein the magnet within the first cavity is between the opposing sidewalls of the first base.

4. The accessory mounting bracket according to claim 1, wherein the magnet within the second cavity is between the opposing sidewalls of the second base.

5. The accessory mounting bracket according to claim 1, wherein an accessory extends perpendicularly from the structure when the first bracket is secured to the structure and the second bracket is attached to the accessory and nested with the first bracket.

6. An accessory mounting bracket comprising:
a first bracket with a first planar base configured for attachment against a vertical surface of a structure;
a first sloped surface extending from the first planar base configured to form a first cavity between the vertical surface of the structure and the first sloped surface, wherein an acute angle is formed between the structure and the first sloped surface;
a second bracket with a second planar base configured for attachment to an accessory;
a second sloped surface extending from the second planar base configured to form a second cavity between the accessory and the second sloped surface, wherein an acute angle is formed between the accessory and the second sloped surface; and
a magnet within each of the first cavity and the second cavity configured to attract one another when the first sloped surface is within the second cavity and the second sloped surface is within the first cavity, such that the accessory is positively retained to and perpendicular from the vertical surface of the structure.

7. The accessory mounting bracket according to claim 6, wherein the acute angle of the first sloped surface is an inverted copy of the acute angle of the second sloped surface.

8. The accessory mounting bracket according to claim 6, further comprising:
a recess in the accessory configured to receive the second bracket;
a selector on the accessory configured to disengage the first bracket from the second bracket when manually engaged.

9. The accessory mounting bracket according to claim 6, wherein the accessory is configured for attachment to any one of a towel bar, a tissue holder, a towel ring, a soap dish, a robe hook, and a tumbler holder.

10. The accessory mounting bracket according to claim 6, wherein the second bracket is removably attached to the accessory with fasteners.

11. The accessory mounting bracket according to claim 6, wherein the second bracket is integrally formed with the accessory.

12. An accessory mounting bracket comprising:
a first bracket with a planar base configured for attachment against a structure;
a first sloped surface extending from the planar base configured to form a first cavity and an acute angle between the planar base and the first sloped surface;
an accessory with a second sloped surface forming a second cavity and an acute angle between the accessory and the second sloped surface; and
a magnet within each of the first cavity and the second cavity configured to attract one another when the first sloped surface is within the second cavity and the second sloped surface is within the first cavity, such that the accessory is positively retained to and perpendicular from the structure.

13. The accessory mounting bracket according to claim 12, wherein the acute angle of the first sloped surface is an inverted copy of the acute angle of the second sloped surface.

14. The accessory mounting bracket according to claim 12, further comprising a selector on the accessory configured to disengage the first bracket from a second bracket when manually engaged.

15. The accessory mounting bracket according to claim 12, wherein the accessory is configured for attachment to any one of a towel bar, a tissue holder, a towel ring, a soap dish, a robe hook, and a tumbler holder.

16. The accessory mounting bracket according to claim 12, wherein the magnet within the first cavity is attracted to the magnet within the second cavity such that the first sloped surface is attracted to and retained against the second sloped surface when in proximity to one another.

17. The accessory mounting bracket according to claim 12, wherein the first sloped surface abutted against the second sloped surface prevents downward motion of the accessory and the magnets limit upward motion of the accessory.

18. The accessory mounting bracket according to claim 12, wherein the magnet within the first cavity is between opposing sidewalls of the planar base.

19. The accessory mounting bracket according to claim 18, wherein the magnet within the second cavity is between opposing sidewalls of the accessory.

20. The accessory mounting bracket according to claim 19, wherein the opposing sidewalls of the first base prevent horizontal motion of the accessory.

* * * * *